United States Patent [19]

Hopkins et al.

[11] Patent Number: 5,685,940

[45] Date of Patent: Nov. 11, 1997

[54] ADHERING TIEDOWN PLIES IN COMPOSITE CONSTRUCTION

[75] Inventors: William B. Hopkins, Seattle; Dale E. Hartz, Renton, both of Wash.

[73] Assignee: The Boeing Company, Seattle, Wash.

[21] Appl. No.: 620,829

[22] Filed: Mar. 20, 1996

[51] Int. Cl.$^6$ .............................. B32B 3/12; B32B 31/20
[52] U.S. Cl. ...................... 156/291; 156/286; 156/306.9; 156/307.3
[58] Field of Search .................................. 156/291, 290, 156/285, 286, 289, 90, 306.9, 307.3, 327

[56] References Cited

U.S. PATENT DOCUMENTS

| | | |
|---|---|---|
| 2,227,212 | 12/1940 | Beck. |
| 2,745,779 | 5/1956 | Ritter et al. . |
| 2,839,442 | 6/1958 | Whitaker . |
| 3,655,818 | 4/1972 | McKown . |
| 3,857,217 | 12/1974 | Reps . |
| 4,162,341 | 7/1979 | Norton . |
| 4,344,955 | 8/1982 | Hammer . |
| 4,353,947 | 10/1982 | Northcutt . |
| 4,622,091 | 11/1986 | Letterman . |
| 4,765,942 | 8/1988 | Christensen et al. . |
| 4,879,152 | 11/1989 | Green . |
| 4,973,508 | 11/1990 | Bretz . |
| 5,061,418 | 10/1991 | Ware . |
| 5,089,328 | 2/1992 | Doerer et al. . |
| 5,135,799 | 8/1992 | Gross et al. . |
| 5,186,999 | 2/1993 | Brambach . |
| 5,234,757 | 8/1993 | Wong . |
| 5,284,702 | 2/1994 | Umemoto et al. . |
| 5,338,594 | 8/1994 | Wang et al. . |
| 5,445,861 | 8/1995 | Newton et al. . |
| 5,604,010 | 2/1997 | Hartz ....................................... 156/327 |

FOREIGN PATENT DOCUMENTS

| | | |
|---|---|---|
| 0424956 | 5/1991 | European Pat. Off. . |
| 89-016292/03 | 1/1989 | Germany . |
| 62-112911 JP | 3/1987 | Japan . |
| 1-171935 | 7/1989 | Japan . |

OTHER PUBLICATIONS

Alteneder, et al., "Processing and Characterization Studies of Honeycomb Composite Structures," from *Proceedings, 38th International SAMPE Symposium and Exhibition*, May 10–13, 1993, Anaheim, California. PCL Internal No. 200–01/93–AW.

Kirk–Othmer, *Encyclopedia of Chemical Technology*, Fourth Edition, vol. 7, pp. 1, 18, and 27–28, 1993.

3M Material Safety Data Sheet, 3M PR 500 Molding Resin, Apr. 26, 1992, Document 11–2704–2, pp. 526–529.

"Chemical Handling Requirements", Paper No. A–1330–CHR–0538, Jul. 1, 1992, 1 page.

"Adhesive For Composite Bonding (350 F Cure)," *Boeing Material Specification, BMS 8–245K*, Orig. Issue 6–Jun.–78, Revised 29–Sep.–1994, pp. 1–17.

*Boeing Material Specification, BMS 8–245K*, Qualified Products List, Orig. Issue 29–Sep.–1994 QPL Rev: (ORG)29–Sep.–1994, pp. 1–2.

Dexter Aerospace, Materials Division, "Material Safety Data Sheet," SYNSPAND X9899 Printed Jun. 24, 1994, pp. 1–5.

*Primary Examiner*—Daniel Stemmer
*Attorney, Agent, or Firm*—John C. Hammar

[57] ABSTRACT

We reduce core crush and ply wrinkling in composite honeycomb sandwich structure by preventing slipping of tiedown plies relative to the mandrel and to one another during autoclave curing. We produce superior panels with lighter weights, improved mechanical properties, and more predictable structural performance. The method involves applying a film adhesive to the tiedown plies in the margin of the part outside the net trim line. During heating of the autoclave and prior to the application of high pressure to the composite structure, the film adhesive cures to form a strong bond between the plys and to the mandrel. When pressure is applied, the tiedown plys are locked together and to the mandrel to prevent slippage between any layers in the panel.

9 Claims, 3 Drawing Sheets

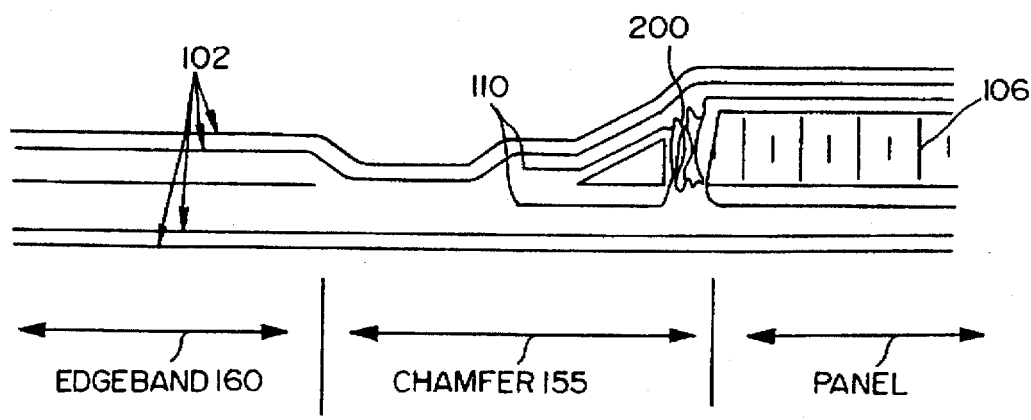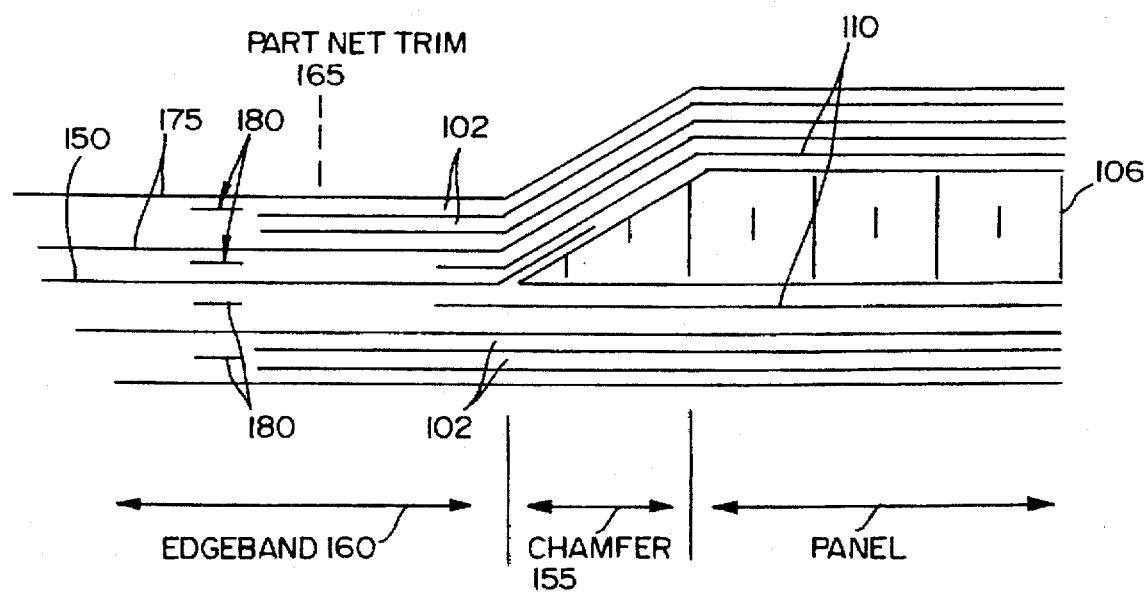

ADHERING TIEDOWN PLIES IN COMPOSITE CONSTRUCTION

NOTICE OF GOVERNMENT RIGHTS

The present invention was made during performance of Contract No. F33657-91-C-0006 awarded by the Air Force. The Government has certain rights in the invention.

TECHNICAL FIELD

The present invention relates to an improvement in the manufacture of composite structure, especially composite honeycomb sandwich structure, where tiedown plys are used to secure the part during autoclave curing at elevated temperature and pressure. To lock the tiedown plies together so that there is no movement of one ply relative to another, we use a lower temperature curing adhesive to cure and to connect the several plys together during the early stages of autoclave curing prior to applying pressure. We apply the adhesive outside the net trim line for the part, so that it is removed during finishing of the part.

BACKGROUND ART

Aerospace honeycomb core sandwich panels (having composite laminate skins cocured with adhesives to the core through autoclave processing) find widespread use today because of the high stiffness-to-weight (i.e., "specific stiffness") and strength-to-weight (i.e., specific strength) ratios the panels afford. Typical honeycomb core sandwich panels are described in U.S. Pat. Nos. 5,284,702; 4,622,091; and 4,353,947, which we incorporate by reference. Altenender et al., *Processing and Characterization Studies of Honeycomb Composite Structures*, 38th Int'l SAMPE Symposium, May 10–13, 1993 (PCL Internal No. 200-01/93-AWA) discusses common problems with these panels, including core collapse (i.e., core crash), skin laminate porosity, and poor tool surface finish. We incorporate this article by reference.

As Hartz et al. described in U.S. patent application Ser. No. 08/587,160 now U.S. Pat. No. 5,604,010 entitled "Composite Honeycomb Sandwich Structure," with a high flow resin system, large amounts of resin can flow into the core during the autoclave processing cycle. Such flow robs resin from the laminate, introduces a weight penalty in the panel to achieve the desired performance, and forces over design of the laminate plies to account for the flow losses. The resin loss from the laminate plies also reduces the thickness of the cured plies which compromises the mechanical performance. To achieve the desired performance and the corresponding laminate thickness, additional plies are necessary with resulting cost and weight penalties. Because the weight penalty is severe in terms of the impact on vehicle performance and cost in modern aircraft and because the flow is a relatively unpredictable and uncontrolled process, aerospace design and manufacture dictates that flow into the core be eliminated or significantly reduced. In addition to the weight penalty from resin flow to the core, we discovered that microcracking that originated in the migrated resin could propagate to the bond line and degrade mechanical performance. Such microcracking potential poses a catastrophic threat to the integrity of the panel and dictates that flow be eliminated or, at least, controlled.

Flow from the laminates to the core occurs because of viscosity reduction of the resin (i.e., thinning) at the elevated processing temperatures. Therefore, prior art attempts to solve the flow problem have generally focused on retaining the ambient temperature viscosity of the resin at the curing temperatures. For example, one might alter the processing cycle to initiate curing of the resin during a slow heat-up, low pressure step to induce resin chain growth before high temperature, high pressure completion. In this staged cure cycle, one would try to retain the resin's viscosity by building molecular weight at low temperatures. Higher molecular weight resins have inherently higher viscosity so they remain thicker and are resistant to damaging flow to the core. Unfortunately, with a staged cure cycle, too much flow still occurs, and the potential problems of microcracking still abound. Also, facesheet porosity might increase beyond acceptable limits. Furthermore, a modified cure cycle increases autoclave processing time. Increased processing time translates to a significant fabrication cost increase with risk of rejection of high value parts at the mercy of uncontrolled and inadequately understood factors. We incorporate the Hartz et al. Ser. No. 08/587,160 application now U.S. Pat. No. 5,604,010 by reference.

U.S. Pat. No. 5,445,861 describes composite sandwich structure for sound absorption (acoustic insulation) and other applications. The sandwich structures have seven layers as follows:

(1) an outer skin;
(2) a small celled honeycomb or foam core;
(3) a frontside inner septum;
(4) a large celled middle honeycomb core;
(5) a backside, inner septum;
(6) a backside, small celled honeycomb or foam core; and
(7) an inner skin.

Tuned cavity absorbers in the middle honeycomb core absorb sound. Performance of this structure suffers from resin flow to the cells of the honeycomb cores during fabrication for the reasons already discussed and because such flow alters the resonance of the structure. We incorporate this patent by reference.

The Hartz et al. process of U.S. patent application Ser. No. 08/587,160 now U.S. Pat. No. 5,604,010 eliminates resin (matrix) flow into the honeycomb core for sandwich structure using high flow resin systems and results in reproducibility and predictability in sandwich panel fabrication and confidence in the structural performance of the resulting panel. Hartz et al. use a scrim-supported barrier film between the fiber-reinforced resin composite laminates and the honeycomb core. This sandwich structure is lighter for the same performance characteristics than prior art panels because the resin remains in the laminate (skin) where it provides structural strength rather than flowing to the core where it is worthless, introducing excess weight and potential panel failure. Hartz et al. also generally use an unsupported film adhesive between the barrier film and the laminates to bond the laminates to the barrier film. With these layers (which might be combined into one product), they achieved improved performance, retained the resin in the laminates and thereby reduced excess resin that designers otherwise needed to design into the panels to account for resin flow into the core, and reliably fabricated panels in which they had structural confidence.

Core crush frequently occurred in the chamfer region of honeycomb core when Hartz et al. cured a panel having a scrim-supported barrier film, particularly when they tried to use lighter weight core materials. Corbett and Smith subsequently discovered that they could reduce core crush in these panels by including a tiedown ply in contact with the core beneath the barrier film (and adhesive) because the tiedown ply reduced slippage of the barrier film relative to the core during curing. They described their invention in U.S. patent application Ser. No. 08/616,903.

Controlling core slippage through the Corbett and Smith method allows us to use the lighter density honeycomb core to produce structures without costly scrap due to core crush. We reduce manufacturing costs both by saving time, materials, and rework/scrap and by improving the reliability of the manufacturing process to produce aerospace-quality panels having the highest specific strength and specific stiffness.

The added tiedown ply that Corbett and Smith use means that three or more tiedown plys will be included in the final preform of the panel. In conventional practice, there will also be tiedown plys on the outer surfaces of the panel and possibly between the laminate and the adhesive barrier film. Each tiedown ply extends outwardly from the part beyond the net trim line of the finished product. Conventionally, the tiedown plies are secured individually and sequentially to the layup mandrel with tape. Especially when using low density core it is important to fix the relation of the plies to one another and to the mandrel. Failure of the tape results in facesheet ply wrinkles or core crush. After incorporation of the Corbett and Smith method, we found that core crush could still occasionally occur when the tiedown ply in contact with the core pulled away from the tape securing it to the mandrel, slipping relative to the other tiedown plies. The adhering strength of the tape alone was insufficient to overcome the forces acting on the core in a Hartz-type panel when we applied autoclave pressure. We discovered how to adhere the tiedown plies to each other reliably, easily, and inexpensively. Adhering the plies to each other distributes the forces acting on any individual ply among all the tiedown plies, reducing the maximum force seen by the tape adhering the tiedown plies to the mandrel. While described with respect to a Hartz-type composite honeycomb sandwich structure, the adhering method is generally applicable to all applications involving tiedown plies in composite construction.

SUMMARY OF THE INVENTION

The present invention relates to adhering tiedown plys to one another during the construction of composite structure, especially during the autoclave processing at elevated temperature and pressure of Hartz-type composite honeycomb sandwich structure. The conventional practice of taping the tiedown plys to the mandrel alone is unsatisfactory, because the taping must be sufficient to prevent slippage of any ply or of one ply relative to another. We discovered that we could adhere the plies effectively to one another to reduce maximum forces on the tape by applying a low temperature curing film adhesive between the tiedown plys just outside the net trim line for the part. In the autoclave, this film adhesive melts and cures at a lower temperature than the resin in the laminates so that it bonds the tiedown plies together prior to increasing the autoclave pressure at the higher temperature where the laminate resin flows and cures. The film adhesive eliminates movement of the tiedown plys relative to one another. In our preferred embodiment for a bismaleimide (BMI) sandwich panel of the Hartz-type, we prefer to use an adhesive that cures at about 250° F. (121° C.) for a BMI that cures around 375° F. (191° C.), and post-cures around 440° F.

BRIEF DESCRIPTION OF THE DRAWINGS

FIG. 5 is a schematic, sectional elevation showing core crush of a honeycomb sandwich panel caused by core and barrier film slippage.

FIG. 6 is another schematic, sectional elevation showing the use of a tiedown ply to reduce core crush.

DETAILED DESCRIPTION OF A PREFERRED EMBODIMENT

As a frame of reference for this description, we will initially describe typical composite honeycomb sandwich structure. Then, we will turn to our invention of a method of reliably adhering the tiedown plies together.

Figure 1:
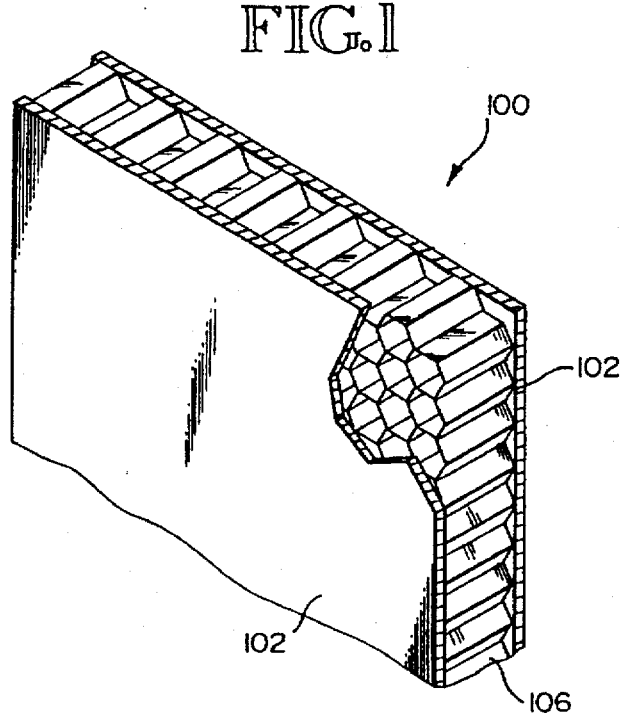
FIG. 1 illustrates a typical composite honeycomb sandwich structure.

A Hartz-type composite honeycomb sandwich panel of U.S. patent application Ser. No. 08/587,160 now U.S. Pat. No. 5,604,070 minimizes, eliminates, or significantly reduces resin flow from the laminates to the core, thereby permitting a simpler processing cycle that is more robust for the manufacture of aerospace structure. Such a sandwich panel 100 (FIG. 1) generally has outer facesheets or skins 102 adhered to a central honeycomb core 106. The finished skins 102 comprise laminates of layers of fiber-reinforced organic matrix resin in a cured and consolidated composite form. The core 106 can be paper, synthetic paper, metal, composite, or the like, as appropriate for the application. In panels of the present invention, we obtain higher specific strengths and higher specific stiffnesses because we reduce core crush during autoclave curing by incorporating at least one tiedown ply between the core 106 and skin 102 to reduce damaging slippage between the core and skin that otherwise often occurs.

To prevent flow of resin from the composite laminate skin to the core, Hartz et al. use an unsupported film adhesive 108 (FIG. 2), a barrier film 110, and a scrim-supported film adhesive 112 between the skin 102 and the core 106 to keep resin out of the cells 114 of the core 106.

Figure 3:
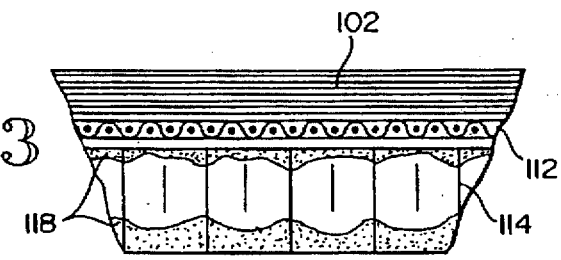
FIG. 3 is a schematic, partial sectional view of prior art honeycomb sandwich structure, suffering resin flow to the core, using a supported film adhesive without a barrier film.

FIG. 3 illustrates the core-filling problems that can result when a film adhesive 112 is used alone without the barrier film 110 and film adhesive 108. Cells 114 of the honeycomb fill with resin 118 which migrates from the laminates and which thereby depletes the resin in the skin 102. Resin depletion impacts structural performance because it reduces ply thickness. Resin depletion increases total weight since the cell resin 118 is simply waste. In all cases, uncontrolled resin flow and depletion makes the panel suspect, especially to microcracking that can begin in the cell resin 118 during thermal cycling and migrate to the fiber-reinforced skin 102, especially at the bond line between the skin 102 and core 106.

Figure 4:
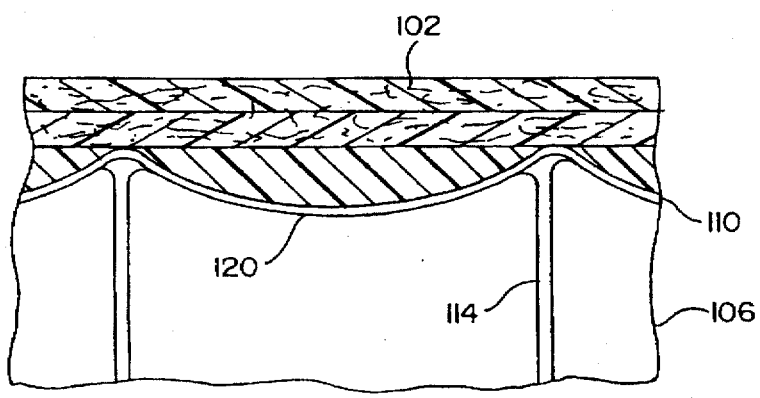
FIG. 4 is another schematic, partial sectional view showing sandwich structure with resin depletion in the skin, but where the resin is prevented from reaching the core with a bulging, unsupported barrier film.

FIG. 4 illustrates undesirable bulging that can occur if a barrier film 110 is used without a scrim-supported film adhesive 112 to try to eliminate cell resin 118. Here, a waste resin bulge 120 protrudes downwardly into the cells 114 of the honeycomb core 106. While the resin is contained in the bulge 120, the skin 102 is still depleted in resin. The flow of resin to bulge 120 imposes structural performance and weight penalties comparable to the uncontrolled condition illustrated in FIG. 3.

Figure 2:
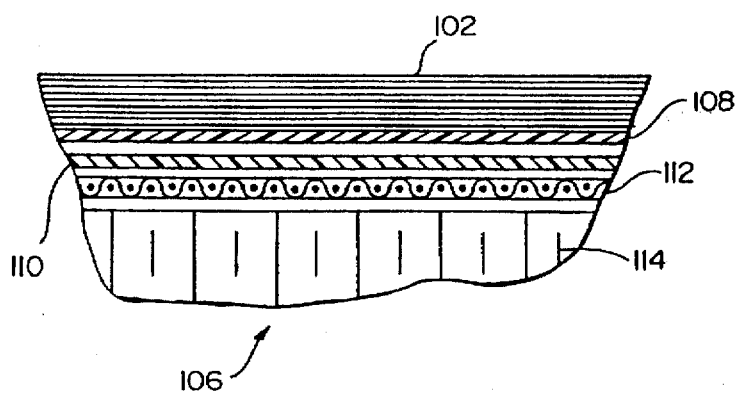
FIG. 2 is a schematic, partial sectional view of the skin-core interface in Hartz-type sandwich structure having a scrim-supported barrier film to prevent resin flow from the skin to the core.

As shown in FIG. 2 with the film adhesive 108, barrier film 110, and scrimsupported film adhesive 12, resin flow is checked without cell resin 118 or resin bulges 120. We discovered, however, that the barrier film produced a slip plane between the laminate skins and the core which often resulted in core crush during the autoclave processing cycle. In 22 of 31 test panels, in fact, Hartz et al. experienced core crush in their initial trials. This rate of failure is unacceptable from a cost and schedule perspective. Our tiedown plys in the chamfer region reduce the frequency of or eliminate damaging core slippage and the core crush attributable to such slippage.

For bismaleimide laminated skins made with RIGID-ITE® 5250-4-W-IM7-GP-CSW, RIGIDITE® 5250-4-W-IM7-GP-CSX, and RIGIDITE® 5250-4-W-IM7-GP-PW prepreg from Cytec Engineered Materials, Inc. (Cytec), the film adhesive 108 preferably is 0.015 psf METLBOND® 2550U adhesive, also available from Cytec. The film adhesive provides additional resin to promote a quality bond between the laminate and barrier film 110. The barrier film 110 preferably is a 0.001 inch thick, bondable grade, surface treated KAPTON® polyimide barrier film capable of withstanding the cure cycle to provide a resin impermeable membrane between the skin 102 and core 106. The scrim preferably is fiberglass, "Style 104" fiber cloth and the film adhesive 112 is 0.06 psf METLBOND® 2550G adhesive, available from Cytec. The scrim-supported film adhesive prevents the barrier film from bulging into the core cells, thereby retaining the resin in the laminate (i.e., skin layers) so that the cured ply thickness is maximized and thereby, we achieve maximum performance at minimum weight for the panels.

The film adhesive 108, barrier film 110, and film adhesive 112 can be purchased as a single item from Cytec as METLBOND® 2550B-0.082 36".

The plys of the skin 102 typically are prepregs of carbon fiber impregnated with bismaleimide thermoset resin, although the present invention applies to other resin systems. Tows might be used in place of the prepreg. The film adhesive 108 should be tailored to achieve an adequate bond between the skin 102 and barrier film 110. The honeycomb core generally is HRP Fiberglass Reinforced Phenolic honeycomb available from Hexcel.

The supported film adhesive and barrier film layers in the sandwich structure also function as corrosion barriers between the skin 102 and core 106 in the case where the core is metal, such as aluminum, and the skin includes a galvanically dissimilar material, such as carbon fiber.

Additional information concerning preferred panels is presented in the technical paper: Hartz et al., "*Development of a Bismaleimade/Carbon Honeycomb Sandwich Structure*," SAMPE, March, 1996, which we incorporate by reference. This paper describes both the Hartz et al. barrier film improvement, the tiedown ply method, and the adhering method of the present invention.

The Hartz-type panels provide mechanical and physical edgeband properties equivalent to solid BMI/carbon laminate (cured at 0.59 MPa (85 psig). Our tests confirm that in our panels the edgeband cured-ply-thickness is equivalent to a solid laminate and that the edgeband 160 (FIGS. 5 & 6) met the requirements of the solid laminate nondestructive inspection specification. The edgeband and facesheet mechanical performance improved over results we achieved with sandwich structure lacking the scrim-supported adhesive, barrier film, adhesive combination. The flatwise tensile mechanical performance also met design requirements.

Preconditioning the core to eliminate volatile evolution during curing by heating the core to about 235° C. (455° F.), prior to laying up the sandwich panel, especially for phenolic core, eliminates core-laminate disbonding otherwise caused by outgassing from the core.

Core crush 200 (FIG. 5) occurs in the chamfer region 155 when the barrier film 110 and core 106 slip relative to the facesheets 102 when autoclave pressure is applied and when the resin is melted. As shown in FIG. 5, the barrier films 100 and core 106 have moved toward the right to compress the core in the chamfer region 155 to produce the core crush 200. The skin 102 has sagged in the edgeband region 160 where the core moved away.

Referring now to FIG. 6, the improved honeycomb sandwich panel includes at least one tiedown ply 150 in contact with the core 106 along a chamfer 155. Such a chamfer (i.e. an angled transition in the core, often at the edgeband 160) typically occurs around the periphery of the panel, but it might also occur intermediate of the panel at join lines or hard points where fasteners or pass-throughs might be necessary in the assembled structure.

Typically Corbett and Smith use a single ply 150 of carbon fiber or fiberglass fabric with a conventional 0/90 fiber orientation in the fabrication of bismaleimide panels having 5 or 8 lb/ft$^3$ HRP core, like Hartz et al. describe. The tiedown ply 150 functions to prohibit or to limit slippage of the skin relative to the core so as to reduce core crush otherwise attributable to the slippage. The tiedown ply 150 anchors the core with the inherent roughness of the fabric when the preform is heated during the autoclave processing cycle and the matrix resin softens, melts, and, for high flow resins, essentially liquefies. With these panels, we can save between 2.5–4 lb/ft$^3$ of core because we can use lighter density honeycomb core without suffering core crush. For a fighter, this change can save as much as 25 lbs per vehicle.

As shown in FIG. 6, the tiedown ply 150 is a narrow, peripheral strip that contacts the core 106 along at least a portion of the chamfer 155 for about 1 inch overlap with the core 106 and extends outward into the edgeband 160 beyond the trimline 165 of the part. The tiedown ply 150 might be on either the flat side of the chamfer or the angled surface (which is how we show it in FIG. 6). The key factor is that the tiedown ply 150 contact the core beneath the adhesive and barrier film 110 which is used to bond the laminate skin to the core. The tiedown ply 150 is cutaway everywhere in the body of the part other than a narrow peripheral area in the chamfer region, and forms a peripheral frame around the edge of the panel. In this way, the tiedown ply 150 allows an adhesive interface between the core 106 and the skins 102 in the panel region.

Traditionally, in making a Hartz-type panel, we use four complete cover sheet tiedown plies 175 in an effort to anchor the layers and the core, and we show all these plies in FIG. 6. These traditional plies 175 were commonly used in sandwich panel fabrication prior to introducing the Hartz-type barrier film, and we commonly use them all, although we believe we can now eliminate all but the outer plies and the peripheral, core contacting tiedown ply 150. That is, we would use three total plies rather than five, as FIG. 6 shows.

The tiedown plies 150 and 175 extend through the edgeband 160 beyond the net trim line 165 to anchoring points that we tape to the layup mandrel. To further prevent slippage of the tiedown plies, we have incorporated a low curing (i.e. 121° C. for BMI panels) film adhesive 180 between the tiedown plies just outside the net trim line of the part. The film adhesive 180 eliminates movement of one ply relative to the others when we apply pressure during the autoclave curing cycle. Curing at a temperature of about 100°–150° F. below the curing temperature of the laminate resin, the tiedown adhesive cures before we need to increase the autoclave pressure and the cured adhesive bonds the tiedown plys to one another. Using the adhering method eliminates relative movement of the plys and eliminates facesheet wrinkles and core crush that otherwise can occur.

The tiedown method of Corbett and Smith saves material, reduces cost, and saves weight, because it use the "picture frame" peripheral tiedown ply 150 (with the traditional, internal sheets omitted). The normal tiedown procedure entails plys on the outer surfaces of the skins and internally between the skin and underlying adhesive (FIG. 5). A traditional tiedown system will fall without the "picture frame" ply because the barrier film 110 permits the core to slip. The Corbett and Smith method will fall occasionally without the adhering method of the present invention.

For lightweight core (i.e. 5–8 lb/ft$^3$) with the bismaleimide prepreg and adhesive system previously described, we hold the chamfer angle to 20°±2°.

By "chamfer" we mean an angled, cut region (a ramp) of the honeycomb core tapering from full thickness to no thickness with a steady slope. A chamfer is used at the edge band of a composite honeycomb sandwich panel to provide a smooth transition between the structural body of the panel that has the embedded honeycomb and a connecting edge band lacking any honeycomb core. The method of the present invention allows us to use much steeper chamfer angles than traditional practices often require if one is to avoid core crush without one tiedown ply. While we prefer a 20° chamfer, we believe that we could increase the angle to whatever angle suited the panel design requirements.

Figure 7:
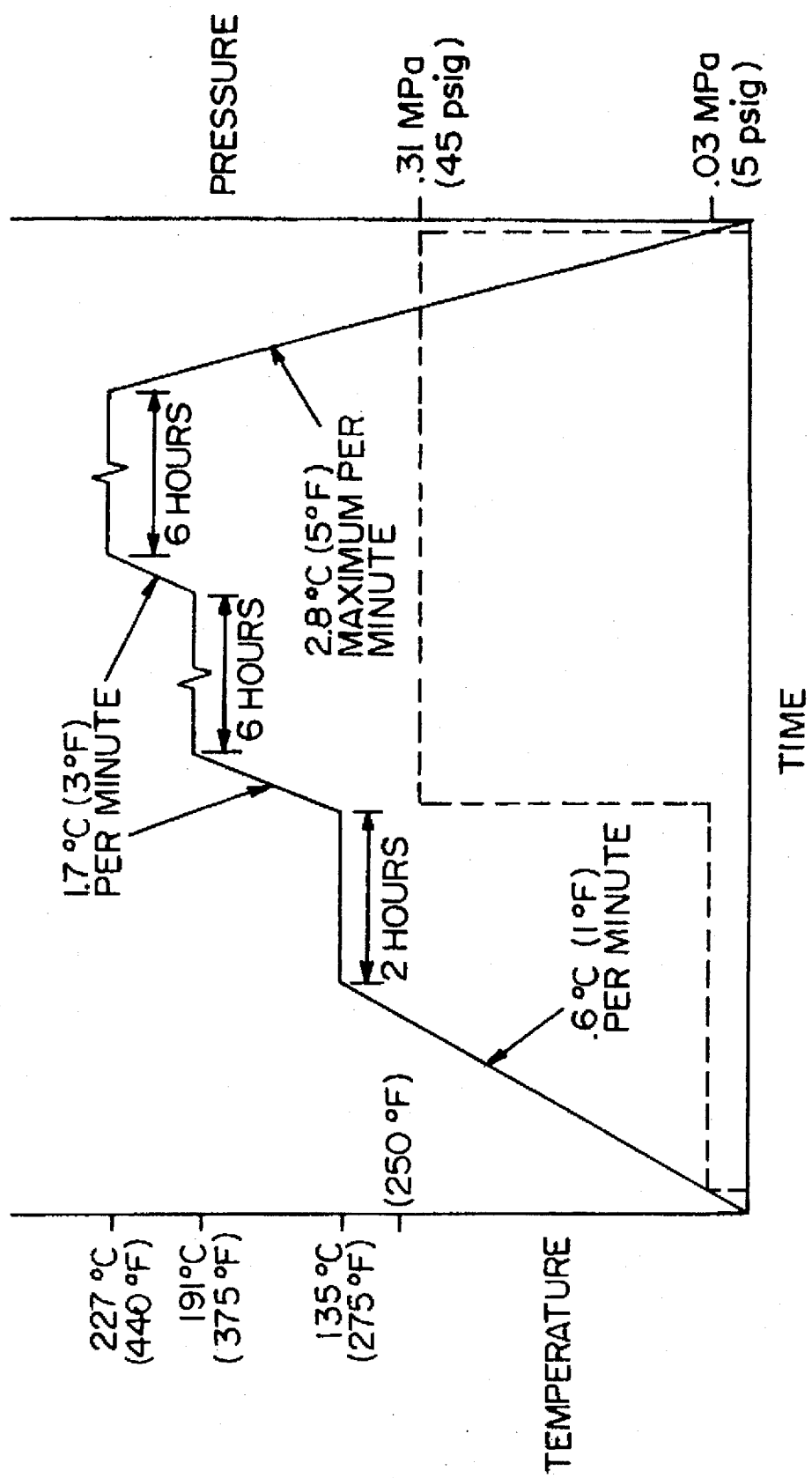
FIG. 7 is a graph of a typical autoclave curing cycle for making Hartz-type composite honeycomb sandwich panels, showing that our tiedown adhesive cures prior to the application of high pressure in the cycle.

By "autoclave processing" we mean the cycle of elevated temperature and pressure applied to the panel to consolidate and cure resin in the laminate while bonding or otherwise adhering the cured laminate to the honeycomb core. Our preferred cycle is illustrated in FIG. 7. Our adhesive for the tiedown plies cures at about 250° F. (121° C.) so it cures prior to the increase in autoclave pressure that can introduce relative motion between layers in the panel.

If core crush occurs, the damage to the panel is generally so extensive that repair is impossible so the part is scrapped. The cost of today's advanced composite resins and reinforcing fibers requires a process that virtually eliminates core crush. Otherwise, the processing costs are prohibitive. With panels being designed as close to the design edge as possible, core crush is a significant issue. The method of the present invention reduces cores crush and ply movement or wrinkling.

While we have described preferred embodiments, those skilled in the art will readily recognize alterations, variations, and modifications, which might be made without departing from the inventive concept. Therefore, interpret the claims liberally with the support of the full range of equivalents known to those of ordinary skill based upon this description. The examples are given to illustrate the invention and are not intended to limit it. Accordingly, define the invention by the claims and limit the claims only as necessary in view of the pertinent prior art.

We claim:

1. A method for adhering tiedown plies together in the manufacture of composite structure, comprising the steps of:

(a) assembling on the layup mandrel a composite preform in the shape of the composite structure, the preform having at least one resin-impregnated laminate and at least two tiedown plies; and (b) adhering the tiedown plies to one another with a film adhesive applied to the plies outside a net trim line of the composite structure wherein the film adhesive cures at a temperature lower than the resin in the laminate.

2. The method of claim 1 wherein the laminate includes bismaleimide matrix resin.

3. The method of claim 1 wherein the preform includes a barrier film made from a bondable grade, polyimide adjacent the laminate.

4. The method of claim 3 wherein the preform includes a honeycomb core and an adhesive between the barrier film and core.

5. The method of claim 4 wherein the preform includes a film adhesive layer between the barrier film and the laminate.

6. The method of claim 4 wherein the preform includes a supporting scrim between the barrier film adhesive and the core to prevent sagging of the barrier film into the core cells.

7. The method of claim 6 wherein the preform includes a tiedown ply in contact with the core between the adhesive and core.

8. A method for reducing core crush in a chamfered composite honeycomb sandwich panel having a resin-impregnated laminate adhered to a honeycomb core, the core having a chamfer, comprising the steps of:

(a) contacting a tiedown ply with the honeycomb core of the panel in the region of the chamfer to prevent slippage between the core and the laminate;

(b) assembling tiedown plies over outer surfaces of the laminate; and (c) adhering the tiedown plies together and to the layup mandrel with a lower temperature curing adhesive applied to the tiedown plies outside a net trim line of the panel, wherein the adhesive melts and cures prior to the application of autoclave pressure and prior to the melt and flow of the resin in the laminate.

9. The method of claim 8 wherein the laminate includes a barrier film to prevent resin flow from facesheets of the laminate to the core cells, and wherein one tiedown ply is between the barrier film and core.

* * * * *